(12) United States Patent
Ritter (10) Patent No.: US 7,624,340 B2
(45) Date of Patent: Nov. 24, 2009

(54) KEY COMMAND FUNCTIONALITY IN AN ELECTRONIC DOCUMENT

(75) Inventor: Gerd M. Ritter, Heidelberg (DE)

(73) Assignee: SAP AG, Walldorf (DE)

( * ) Notice: Subject to any disclaimer, the term of this patent is extended or adjusted under 35 U.S.C. 154(b) by 345 days.

(21) Appl. No.: 11/319,518

(22) Filed: Dec. 29, 2005

(65) Prior Publication Data

US 2007/0157075 A1  Jul. 5, 2007

(51) Int. Cl.
*G06F 17/21* (2006.01)

(52) U.S. Cl. .................. 715/224; 715/205; 715/708

(58) Field of Classification Search ............... 715/205, 715/207, 505, 507, 708, 224
See application file for complete search history.

(56) References Cited

U.S. PATENT DOCUMENTS

| | | | | |
|---|---|---|---|---|
| 4,689,737 A | * | 8/1987 | Grant | 704/8 |
| 5,355,497 A | * | 10/1994 | Cohen-Levy | 707/200 |
| 5,367,619 A | * | 11/1994 | Dipaolo et al. | 715/221 |
| 5,392,386 A | * | 2/1995 | Chalas | 715/841 |
| 5,513,308 A | * | 4/1996 | Mori | 715/707 |
| 5,623,406 A | * | 4/1997 | Ichbiah | 704/3 |
| 5,794,259 A | * | 8/1998 | Kikinis | 715/207 |
| 5,845,300 A | * | 12/1998 | Comer et al. | 715/203 |
| 5,899,989 A | * | 5/1999 | Ikeuchi et al. | 707/3 |
| 5,974,413 A | * | 10/1999 | Beauregard et al. | 707/6 |
| 6,167,523 A | * | 12/2000 | Strong | 726/21 |
| 6,438,545 B1 | * | 8/2002 | Beauregard et al. | 707/6 |
| 6,691,111 B2 | * | 2/2004 | Lazaridis et al. | 707/6 |
| 7,310,636 B2 | * | 12/2007 | Bodin et al. | 707/4 |
| 2002/0010639 A1 | * | 1/2002 | Howey et al. | 705/26 |
| 2002/0082857 A1 | * | 6/2002 | Skordin et al. | 705/1 |
| 2002/0103827 A1 | * | 8/2002 | Sesek | 707/505 |
| 2002/0152332 A1 | * | 10/2002 | Rensin et al. | 709/330 |
| 2005/0043949 A1 | * | 2/2005 | Roth et al. | 704/251 |
| 2006/0179404 A1 | * | 8/2006 | Yolleck et al. | 715/507 |

* cited by examiner

*Primary Examiner*—William L Bashore
*Assistant Examiner*—Gregory A Distefano
(74) *Attorney, Agent, or Firm*—Kenyon & Kenyon LLP (57) ABSTRACT

Key command functionality is provided in an electronic document through a recognition of input data. The input data is received in a data field of the electronic document. If the input data is a help command, a help application is launched. The help application provides for the determination of a stored input data value to be inserted in the corresponding data field. If the input data is not a help command, but is a key command, the corresponding key application is identified and accessed. The key application is thereupon launched, where the key application executes steps for determining information ancillary to the form but useful for completing the form.

24 Claims, 5 Drawing Sheets

KEY COMMAND FUNCTIONALITY IN AN ELECTRONIC DOCUMENT

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyright rights whatsoever.

BACKGROUND OF THE INVENTION

The present invention relates generally to auto-help features associated with electronic forms and more specifically the determination and execution of additional feature applications in an electronic document.

In existing electronic document systems, there are numerous techniques for assisting the user in entering data into the electronic form. A common example of a data fill operation is based on previous data entry operations. For example, if a user utilizes an electronic mail program, input key recognition techniques may be used to anticipate a common electronic mail address. For example, if a person sends an electronic message to "user@address.com," the electronic mail program may suggest the address after receiving the input "u."

Another common technique is an approach commonly known as auto-fill. This feature allows for the automatic filling of multiple data fields in a multi-field input form. For example, if the form includes address information, the insertion of a person's name in the first data field may trigger the auto-filling of the data into the rest of the form. This technique can be commonly found in internet web sites where a user fills out an electronic form, such as an order form. One technique may include locally saved software code, e.g. cookies, that enable the auto-fill of the requisite information.

In addition to auto-fill features, there are other techniques for assisting a user in completing an electronic document. A common feature in current applications are the utilization of help commands. These commands are predetermined commands typically known by most users for the generation of additional preset features relating to assisting the user in generating data for a specific data field. Help commands are limited to the corresponding data fields and established specific data sets. The specific data sets are directed to finding the information for the specific data field, for example the help command relating to the address field for an electronic mail would use the address book as its data set.

In one example, a help command may be associated with a data field for an input form relating to an electronic mail message. The data field may be an address field for an intended recipient. The help command may include the auto-fill operation suggesting known addresses from an address book. Another example of a help command may allow a person to perform data searching relating to the data field. An example of this feature may be a designated keystroke or selectable icon on a visual display that launches a secondary display. In the example of an address book, current systems provide for a dedicate keystroke (e.g. F4) to automatically launch the address book. Another help command is entering the search term itself in the data field for performing the corresponding search. For example, if a user enters "Smith, W," this may provide a pop-up window having the selection of "Walter Smith" and "Wendy Smith" if these names are in the corresponding address book.

As diverse as are electronic forms, there exists a corresponding diversity of the types of data fields. Help commands provide a universal interface for providing assistance to retrieving information for the specific corresponding data field. Additionally, since the help commands provide a general interface, the user is often required to perform various levels of steps to acquire the desired specific information. In one example, an electronic form may be related to a car, including data fields providing for the make, model and other elements. The form may include an additional data field relating to warranty information, such as available warranties that a purchaser may wish to acquire when ordering a vehicle.

In the existing systems using the help commands, a user may enter a help command to launch a pop-up window having a list of all available warranties. Because the help command is a general interface command programmed to provide assistance for the insertion of the input data for the warranty data field, the pop-up window is also a general window that includes all warranty information. A user using this system would be required to manually scroll through all the available warranties listed in the pop-up window.

Current help commands are limited in available functionality and can be cumbersome to user. The help commands are limited to the specific data fields and are limited by the corresponding data sets. Similarly, as these help commands are typically universal to the data fields, users are required to learn the specific corresponding commands in addition to other features of the system As the input form processing environment maintains the universal aspect to these help commands, their effectiveness beyond simple data retrieval operations is thereby limited.

DETAILED DESCRIPTION

An electronic document retrievable from a storage device provides improved functionality for the user through the inclusion of the ability to perform further operations based on key commands. The inclusion of key commands, in addition to the help commands, provides a greater degree of flexibility not only in the additional information sought in the electronic document but also with the eased in which this information may be retrieved.

Figure 1:
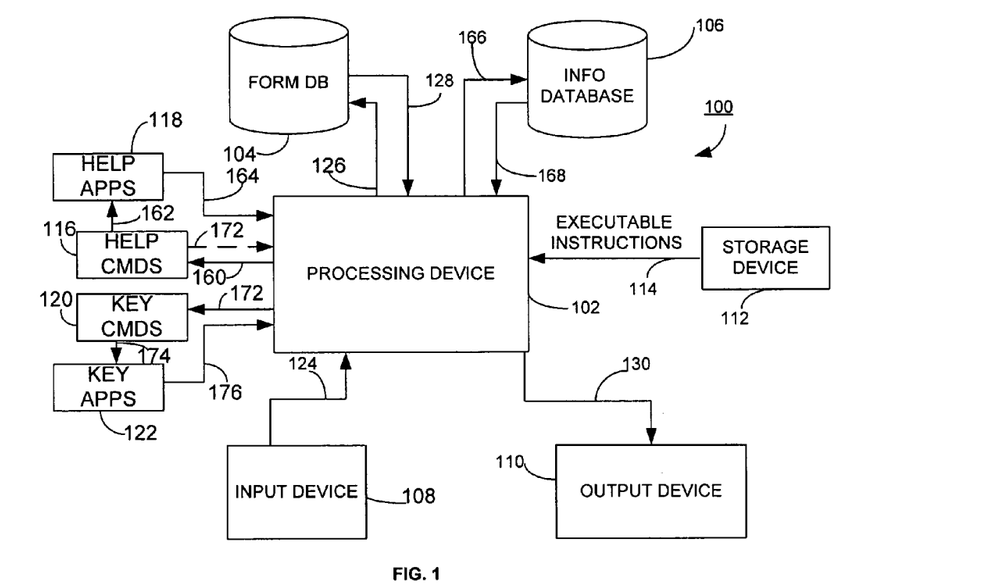
FIG. 1 illustrates a block diagram of an apparatus including a processing device providing for the key command functionality in an electronic document.

FIG. 1 illustrates an apparatus 100 providing for key command functionality in an electronic document. The apparatus 100 includes a processing device 102, a form database 104, an information database 106, an input device 108, an output device 110 and a storage device 112 having executable instructions 114 stored therein. Further included in the apparatus 100 is a list of help commands 116 with a corresponding collection of help application 118 executable in response to the selection of a help command. Additionally, the apparatus 100 includes a list of key commands 120 with a corresponding collection of key applications 122 executable in response to the selection of a key command.

The processing device 102 may be one or more processing elements within a local or networked processing environment. The form database 104 and the information database 106 may be one or more suitable type of memory devices accessible by the processing device 102. The input device 108 and output device 110 may be suitable devices providing for input and output through the processing device 102 in accordance with known usage techniques for interfacing with the processing device 102. The storage device 112 may be a local or remote storage element or elements operative to provide the executable instructions 114 for the processing device 102 to perform operations as described in further detail below. In one embodiment, the storage device 112 may be a computer readable medium, readable subject to recognized techniques for providing the executable instructions 114 from the medium 112 to the processing device 102.

In the embodiment of FIG. 1, the processing device 102 receives input commands 124 from the input device 108. One input command 124 may include a form retrieval request, for example a user using a database operating system may seek to load a particular electronic document, such as an input form associated with the electronic document. As an example, a user may seek to load an electronic mail form using known interfacing techniques. The processing device 102 transmits a form request command 126 and receives a blank form 128 from the form database 106. Additionally, upon receipt of the form 128, the processing device 102 may provide an output display signal 130 to the output device 110 for provide a visual display of the form 128, typically in a primary display window within an application on processing system.

Figure 2:
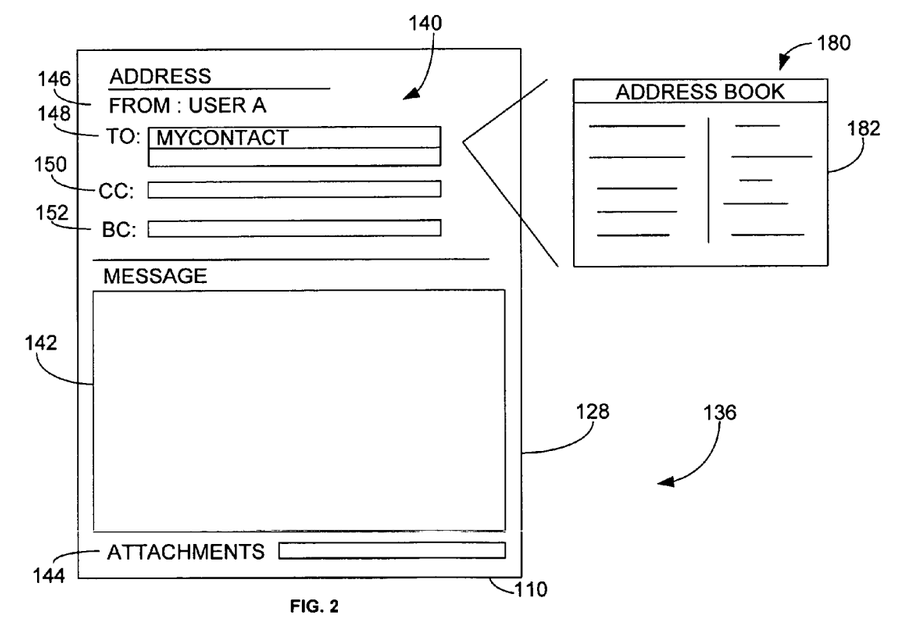
FIG. 2 illustrate a graphical representation of a display of an input form electronic document including key command functionality.

FIG. 2 illustrates a graphical representation of an example of an electronic mail form 128 which may be viewable in a primary display frame 136 on the output device 110. The form 128 includes an address portion 140, a message portion 142 and an attachment portion 144.

Within the address portion 140 of the form 128, there is a "from" field 146, a "to" field 148, a carbon copy "cc" field 150 and a blind copy "bc" field 152. The "from" field 146 may be pre-populated based on existing knowledge of the user using the underlying application. In the "to" field 148, the user may wish to seek additional information for address information, for example if the user does not know the correct electronic mail address of the intended recipient(s).

In accordance with existing help command techniques, the user may utilize one of a variety available help commands that provide for a help application for determining a stored input data value to be inserted in the corresponding data field. For example, the user may utilize a character recognition auto-fill feature that anticipates mail addresses based on letters being input into the data field. Using the above-noted example, the user starts typing the letter "u," the processing device 102 may suggest a scroll-down list of all mail addresses in the user's address book that begin with the letter "u." Additionally, as the user enters further letters, the list may be similarly narrowed.

With reference back to FIG. 1, the processing device 102, with the input form 128 being displayed and receipt of input data 124 from the input device 108, the processing device 102 determines if the input data 124 represents a help command. As graphically illustrated in FIG. 1, the processing device 102 provides a reference check 160 to the list of help commands 116. If the data input is a recognized help command from the list 116, a help application retrieval command 162 is provided to the storage of help applications 118. The corresponding help application 164 is provided to the processing device 102 for execution thereon.

In the example of the electronic mail form, one commonly available help command is the searching for a recipient's name. In this example, the processing device 102 may recognize the input data fails to recognize any known complete mailing addresses and thus recognizes this operation as a help command. The corresponding help application may provide for the searching of the address book based on the input data to suggest addresses based on the currently entered data. If the address book is stored locally, the processing device 102 may then locally perform this search. Where the data may not be local, the processing device may execute a data request 166 to the information database 106 to retrieve the corresponding information 168. In the example of electronic mail address information, the processing device 102 may perform a search of the database 106 to retrieve only the addresses corresponding the input data. Although, this information is typically provided without significant delay to the user so the typical embodiment would be the address data being locally stored to the application providing the form.

Using this help command, the user may then be presented with an embedded secondary display of the results of the help application. In the above example, the embedded secondary display may be a list of the addresses matching the input data. For example, the secondary display may be a mini scrollable overlay display overlaid with the listing of all email addresses begin with the currently entered letters, so the user may select one of the names and have the corresponding address filled into the field. For example, this technique may be used with the above example of typing in the letter "u".

In the event that the processing device 102 determines the data input is not a help command, such as receiving an indication 170 from the help command list 116, the processing device 102 checks if the input data is a key command. Whereas the help command is a pre-defined command providing assistance to the specific data field, the key command allows for assistant ancillary to the data field itself. An example of a key command may be typing the term "warranty" on a vehicle order form in a field dedicate for receiving information requesting a product or service options for the purchase of a vehicle. As described in further detail below, this would then allow a secondary display with available warranty information and the information may be assimilated based on the existing vehicle information already in the order form. Warranty information is an ancillary term to the expected terms in the data field, but through this key command assistance applications may be provided. The processing device 102 references 172 the key command list 120. If the input data 124 is a key command, a launch command 174 to a list of key applications 122, whereupon the corresponding key application 176 is provided to the processing device 102 for execution thereon.

Referring back to FIG. 2, FIG. 2 illustrates an exemplary key command being inserted in to the "to" field 148 of the form 128. Recognized by the key command list 120 of FIG. 1, the processing device 102 executes the corresponding key application based on the instructions associated with the input data of the term "mycontact" in the "to" field of the electronic mail form 128. In one embodiment, this key application provides for the display of a list of available contacts, which may be found in personal contact lists in an address book or other storage location (such as database 106). The results of this execution may also be provided in a secondary display frame, such as the secondary display frame 180 of FIG. 2. This secondary display frame 180 displays the address book 182 having a list of address information. This secondary display 180 is typically included on the output device 110 and based on the size of the available display, may occlude all or a portion of the form 128 in the primary display 136.

In the secondary display frame 180, the user may interact using one of a variety of input devices to actively search the address book 182. Whereas the help command is limited to finding only those address fields containing terms physically entered into the corresponding data field, the key command launches the secondary display 180 providing for the personal address book 182. This full address book 182 then allows the user to perform further searching for address terms. For example, if the user does not know if an address term begins with a persons last name or the first initial of their first name and then the last name, the help command would require the user to guess at one approach and if wrong try the other. Similarly, if the user does not even know the persons mail address, the help command can have limited usefulness as a certain amount of knowledge of the underlying terms is required to execute the help command. Upon selection of an address term, the selected term may then be inserted into the "to" field 148.

Figure 3:
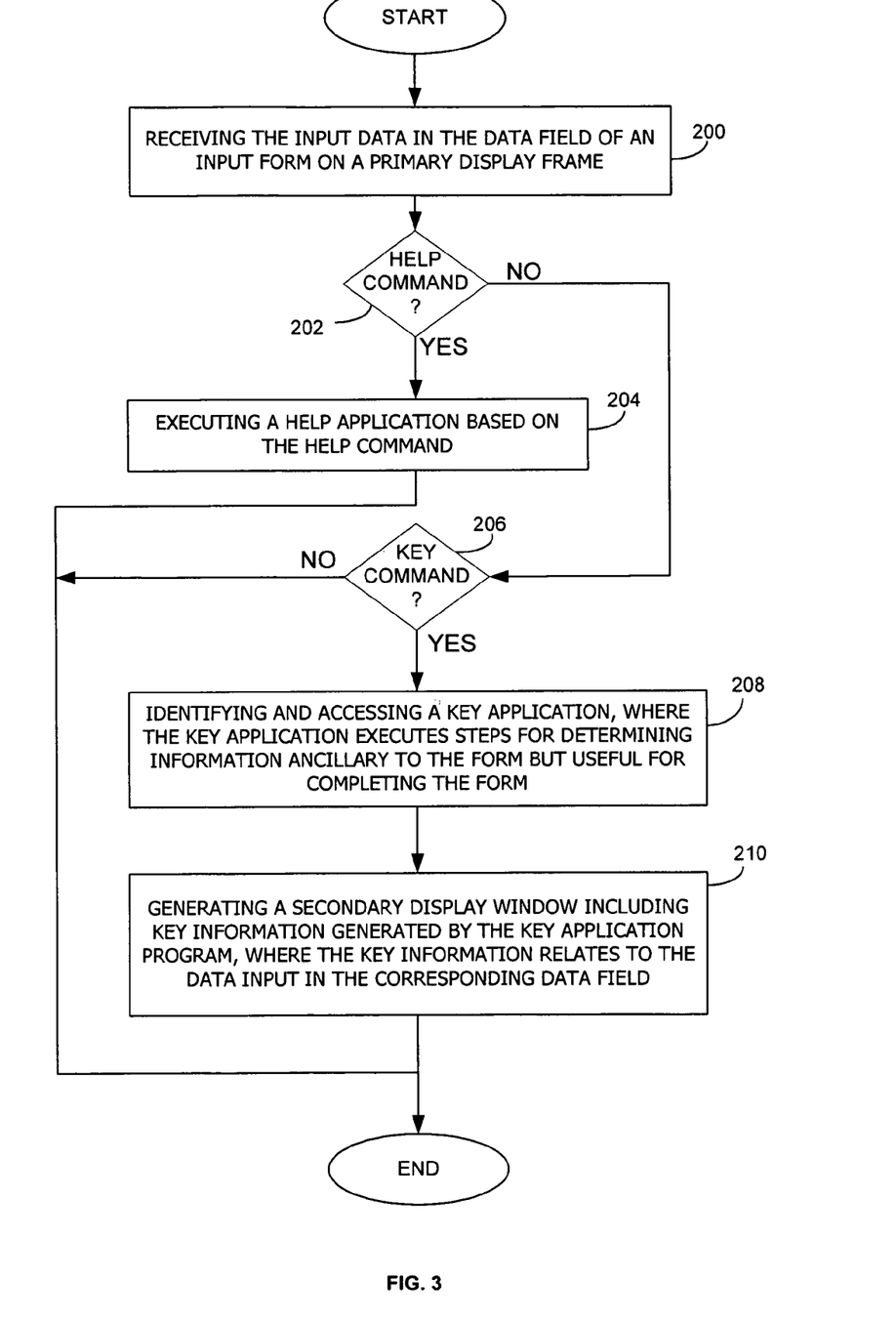
FIG. 3 illustrates steps of a flowchart of one embodiment of a method for application functionality using a key command in an electronic document.

FIG. 3 illustrates a flowchart of the steps of one embodiment of a method for application functionality in an electronic document. The method begins, step 200, by receiving the input data in the data field of an input form on a primary display frame. As illustrated above with respect to FIG. 2, the input data may be the term "MYCONTACT" typed in the "to" data field 146 of the input form 128 which is within a primary display on the output device 110.

The next step, step 202, is determining if the input data is a help command. As described above, this may be performed by the processing device 102 checking the input data relative to a list of help commands 116. If the input data is a help command, the next step, step 204, is executing a help application based on the help command. This help application provides assistance to the user in determining specific information related directly the corresponding data field. In the above example of an electronic mail, the help command may be activated by the reception of partial address information, where the help command provides suggestions of addresses beginning with or containing the entered terms.

In the event the input data 202 is determined to not be a help command, the next step, step 206, is a determination of whether the input data is a key command. In one embodiment, this step may be performed similar to the step 206, by referencing a list of corresponding key commands. If the input data is not a key command, the processing device performs standard operations, such as advancing to the data field in the input or other operations. As the input data is not a help command or a key command, neither a help application nor a key application are launched.

If, in step 206, it is determined that the input data is a key command, the next step, step 208, is identifying and accessing a key application, where the key application executes steps for determining information ancillary to the form but useful for completing the form. For example, the information ancillary to the form may be a direct access to searching an address book for finding information usable in the form. The key application may be identified by referencing the key application to the key command and may be accessed from a storage device having the various key applications stored therein and available for execution by the processing device.

The next step, step 210, is generating a secondary display window including key information generated by the key application program, where the key information relates to the data input in the corresponding data field. As illustrated above in FIG. 2, an exemplary second display 180 may be the personal address book of contact information generated by the key application in response to the key command of "mycontact." Thereupon, in this embodiment, the method is complete.

Figure 4:
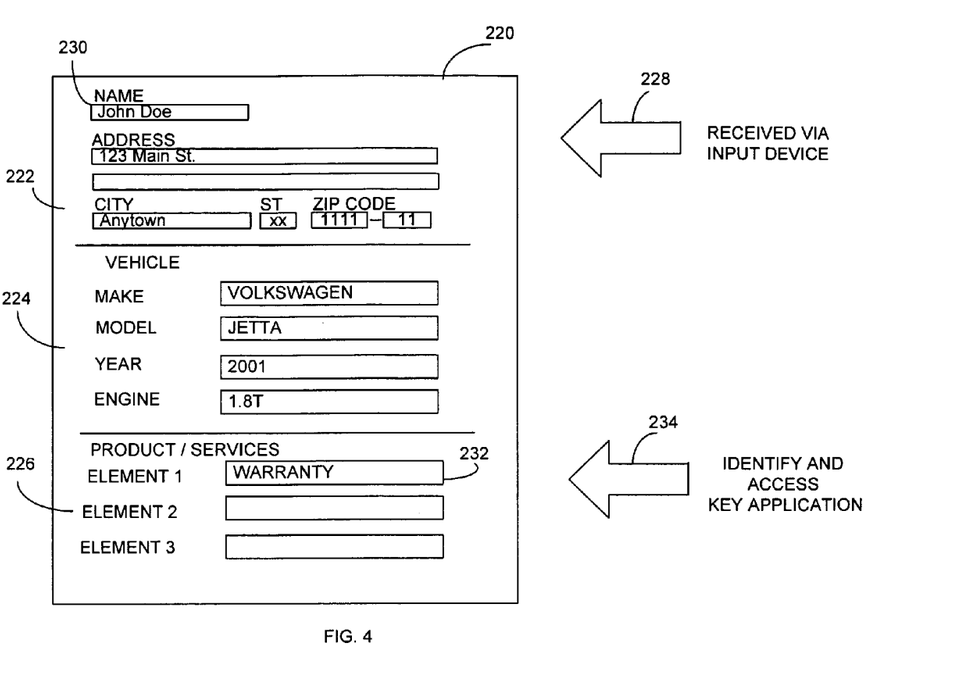
FIG. 4 illustrates a graphical representation of a display of an input form electronic document including key command functionality.

The key command provides functionality in further embodiments of electronic documents such as input forms. FIG. 4 illustrates an exemplary input form 220 directed to automotive information, specifically tire information for a particular vehicle. This form 220 may be a purchase order form used by a sales representative in taking an order from a customer.

The form 220 includes numerous data fields, such as the listed customer information fields 222, vehicle information fields 224 and product or service option fields 226, which may provide optional product or services available with a purchase of the vehicle in the information fields 222. The form 220 may include existing data fill features to load some of the data fields based on input data and simplify the data entry requirements for the user. Illustrated in FIG. 4, the action of receiving input data may be received by an input device 228, providing the input data into the data fields. For example, if the customer's name, here given the example of "John Doe" is in the system, upon entering this information in the name field 230, the corresponding address information 232 may be automatically provided.

Figure 5:
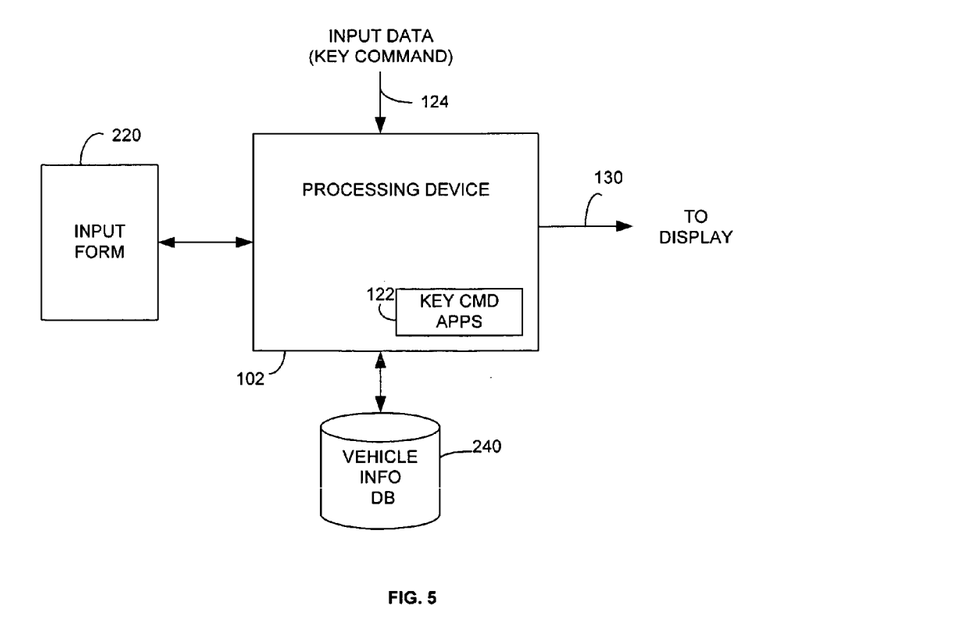
FIG. 5 illustrate a block diagram of a processing device generating a visual display including the key command.

FIG. 5 illustrates a block diagram representing the operations that may be occurring relative to the form 220. In the processing device 102, the device receives the input data 124. The input data may be standard data used for completing the form 220 of FIG. 4, or may be directed to either a help command or a key command. It is within the processing device 102 that this determination is made and various operations are thereupon taken.

Referring back to FIG. 4, the form 220 is partially completed based on the input data. It is recognized that the form 220 may also be partially completed based on help commands or auto fill operations based on portions of entered input data. In the example of FIG. 4, the form 220 directed to a vehicle purchase including the options to purchase products or services associated with the vehicle information 224. This information may be entered by the user typing in information in specific fields. In other embodiments, if the vehicle information 224 is already within the system, this information may be populated into the data fields based on the retrieval of the customer information 222. For example, the customer might be a return customer previously getting a price quote or taking a test drive of the vehicle. In another embodiment, the data fields may provide successive pull down menus each updated based on the previous, for example the "Make" pull down menu lists all car manufacturers. Upon selection, the model menu is updated to reflect only models available by the manufacturers. Upon selection, the year is updated to reflect the years that model was offered, and so on.

In the example of the form 220 of FIG. 4, the user may then enter a key command in the product/services portion 226.

Illustrated in FIG. 4, the operation of this step may be again reflected by step 228. In this example, the user enters a key command warranty" 232 in one of the data fields in the element fields of the product/services portion 226. The form 220, through underlying processing instructions performs the operational step illustrated as step 240.

From an operational perspective, FIG. 5 illustrates one embodiment of the processing that may occur to provide such functionality. The processing device 102 receives the input data 124, which in this embodiment is determined to be a key command. Previously, the processing device 102 was associating the input data 124 with the input form 220, which may be within the processing device a compilation of data internally associated and stored in a temporary memory location. Simultaneously, the processing device 102 may be providing the output 130 to the display, providing the user with direct feedback on the data input.

When the input data 124 is a key command, the processing device identifies this command and accesses a corresponding key application from a list of available applications 122. The processing device 102 then executes this specific key application as it relates to providing additional information allowing a user to complete the form 220. In the example of FIG. 4, the key command warranty" provides a directed functionality as this key command is used in the form 220 relating to a sales form for a vehicle. Based on this specific operation relating to warranty information, the processing device, in response to the key command application, accesses a vehicle information database 240 to retrieve warranty information that can be provided in an key application.

It is recognized that the form 220 may include functionality for existing help commands. An example of a help command may be to find a list of product/services available for purchase. The help command, being a generalized interface command does not include the ability to have specificity to the form 220 itself, but is rather associated with the corresponding data field. In the example of the key command "warranty," 232, a help command may include a user entering a recognized command, such as the term "help." This would provide the user with a help screen directed to the available options of product and/or services, but does not contain the ability to actively narrow this help to the other data associated with the form. The help command provides specific help to the corresponding data field, here a list of different products or services.

In the key command application, the key command provides assistance for determining information ancillary to the data field but useful for completing the form. In the processing device 102 of FIG. 5, the key command application includes recognizing the input form 220 as well as the input data already associated with the form.

Figure 6:
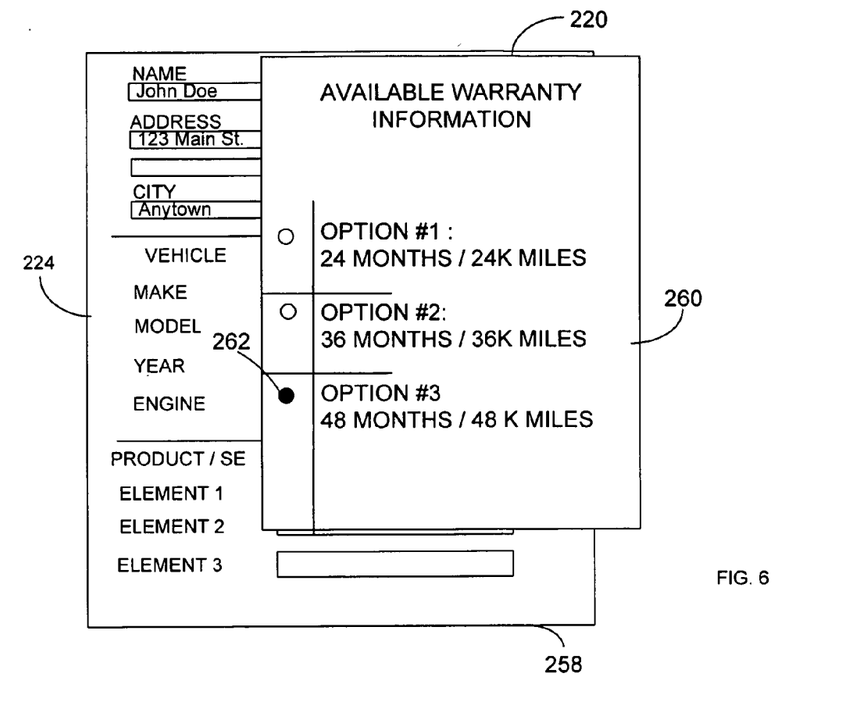
FIG. 6 illustrates a graphical representation of a primary display and a secondary display generating by the electronic document including key command functionality.

FIG. 6 illustrates a graphical representation of the form 220 which is in a primary display frame 258. In this embodiment, the processing device 102 of FIG. 5 is operative to generate a second display frame 260 including additional information relative to the form 220 and not simply limited to the data field, which in this example is an "element" field in the product/services data field portion In this secondary display 260, the key application provides a visual display of available warranties associated with the particular vehicle information 224. In this example, the processing device 102 of FIG. 5 executing the key application retrieves the warranty data that relates to the entered vehicle information and limits the secondary display 260 to just that information. In this example, the warranty data may include three types of warranties all based on different time and mileage factors, such as a 24 month/24,000 mile warranty, a 36 month/36,000 mile warranty and a 48 month/48,000 mile warranty. Through standard interfacing techniques, the user may then select a particular warranty, such as selecting a radio button 262. The selected warranty information presented in the secondary display may be selected based an examination of the existing data in the form 220. In another embodiment, this data may be selected based on data relating to the input form, such as for example master data associated with the form.

Figure 7:
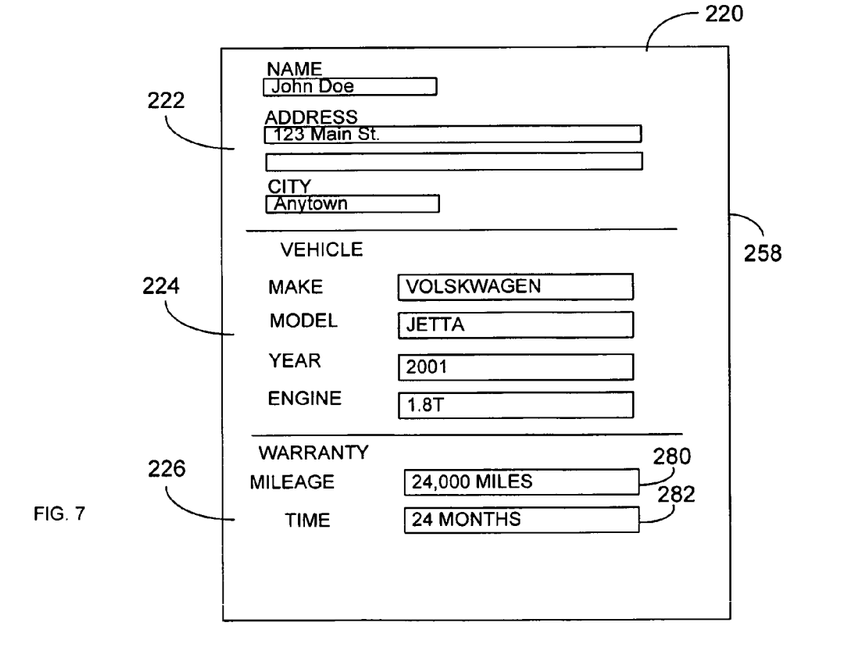
FIG. 7 illustrates a graphical representation of a primary display after using the key command functionality.

As the key command provides functionality to completing the form, FIG. 7 illustrates an example of the form 220 once the radio button 260 of the secondary display 262 of FIG. 6 is selected. The secondary display 262 of FIG. 6 may be automatically removed, leaving only the primary display with the updated information inserted in a warranty data portion of the form 220, the warranty portion not previously visible. Through the utilization of the key command, the warranty portion of the form 220 may be completed in a single operation, based on warranty information that is available. Using the single key command may provide the insertion of the warranty type into the warranty field 280. It is recognized that offer fields, for example price, may also be automatically populated as appropriate. Using the help operation for this solution would require assistance to the individual data fields, which in this example would be assistance for the types of products and/or services that would be available. It is recognized that a help command may include further limiting data field selections in descending data fields, such as described above in the example of completing the vehicle portion 224, but once again this technique still requires addressing each individual data field one at a time, which can be time consuming in completing electronic forms.

Figure 8:
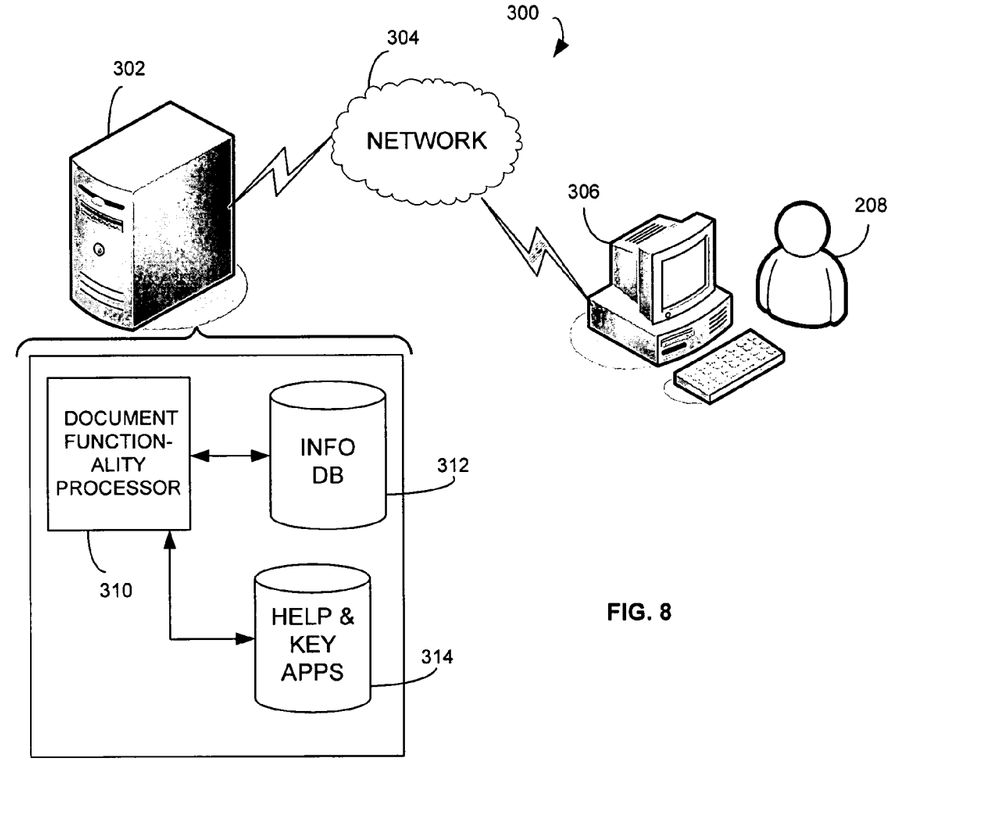
FIG. 8 illustrates another embodiment of a processing environment including a processing device providing for the key command functionality in an electronic document.

FIG. 8 illustrates a processing environment 300 including a server 302, a network 304 and a computing device 306 usable by a user 308. The user 308 may utilize the computing device 306 to access the server 302 across the network 304. In this embodiment, the server 302 includes an electronic document functionality processor 210, an information database 312 and a database 314 stored help applications and key applications. The processor 310 may operate similar to the processor 102 described above, operative to perform operations as outlined in the steps of the flowchart of FIG. 3, among other operations.

Through the network 304, the electronic document functionality processing may be performed for the identification and execution of a key application for assisting in completing the electronic document, as described above, and providing a visual display to the computing device 306. Not illustrated, the server 302 may be in operative communication with other servers across the network 304 to perform other functions associated with the electronic documents. For example, if the document is an input form for a sales order, the server 302 may be in communication with an order processing server across the network to fulfill the corresponding order of the form.

Through this technique, additional assistance is provided to completing the data entry into an electronic document. This approach provides a second level of benefit beyond existing help commands which offered user assistant to a specific data field. With the inclusion of key commands, electronic documents may maintain the existing help command benefits but also realize the benefits associated with the corresponding key commands that provide assistant to completing the form and not specifically the input field.

Although the preceding text sets forth a detailed description of various embodiments, it should be understood that the legal scope of the invention is defined by the words of the claims set forth below. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should be understood that there exist implementations of other variations and modifications of the invention and its various aspects, as may be readily apparent to those of ordinary skill in the art, and that the invention is not limited by specific embodiments described herein. It is therefore contemplated to cover any and all modifications, variations or equivalents that fall within the scope of the basic underlying principals disclosed and claimed herein.

What is claimed is:

1. An apparatus for application functionality in an electronic document in response to a user typing textual input data in a data field, the apparatus comprising:
   a form database storing input forms corresponding to a plurality of input form types;
   a memory device storing executable instructions; and
   a processing device, in response to the executable instructions, operative to:
      receive the textual input data typed by the user in a first data field of a first data type of an input form containing a plurality of data fields, the input form retrieved from the form database and corresponding to one of the plurality of input form types;
      when the textual input data typed by the user is one of a plurality of predetermined help commands, execute a help application based on the help command, where the help application provides for the determination of a stored input data value to be inserted in the first data field; and
      when the textual input data typed by the user is a key command:
         identify and access a key application, wherein the key application provides a list of user-selectable options in a secondary display, the list of user-selectable options being selected based on both the input form type and input data from a second data field of a second data type in the input form; and
         responsive to a received selected option from the list of user-selectable options:
            populating the first data field with the selected option;
            inserting an additional field in the input form related to the selected option; and
            automatically populating, the additional field with data related to the selected option.

2. The apparatus of claim 1 further comprising:
a display device providing a display of the input form in a primary display frame; and the processing device further operative to generate a secondary display window including key information generated by the key application program, where the key information relates to the data input in the corresponding data field.

3. The apparatus of claim 2 wherein the processing device is further operative to provide the secondary display window to an output device to be viewable in relation to the primary display window.

4. The apparatus of claim 2 further comprising:
an input device coupled to the processing device, the processing device operative to:
   receive input commands relating to the key application;
   determine a data set in the key application based on the input commands; and
   associate the data set with at least one of the data fields in the input form.

5. The apparatus of claim 4 further comprising:
a data set storage device coupled to the processing device such that the data set is retrieved from the data storage device.

6. The apparatus of claim 5 further comprising:
the input device providing a selection command to the processing device for selecting the data set.

7. The apparatus of claim 6, the processing device further operative to:
   when executing the key application, examine at least one of: previously entered data in the input form and data related to the input form, and executing the key application based on at least one of the previously entered data.

8. The apparatus of claim 7 wherein the processing device is further operative to examine the data input and the data field having the data input therein.

9. The apparatus of claim 1 wherein the key command is user-defined.

10. A method for application functionality in an electronic document in response to a user typing textual input data in a data field on a display, the method comprising:
   receiving the textual input data typed by the user in a first data field of a first data type of an input form containing a plurality of data fields on a primary display frame, the input form corresponding to an input form type;
   when the textual input data typed by the user is one of a plurality of predetermined help commands, executing a help application based on the help command, where the help application provides for the determination of a stored input data value to be inserted in the first data field; and
   when the textual input data typed by the user is a key command:
      identifying and accessing a key application, wherein the key application provides a list of user-selectable options in a generated secondary display, the list of user-selectable options being selected based on both the input form type and input data from a second data field of a second data type in the form; and
      responsive to a received selected option from the list of user-selectable options:
         populating the first data field with the selected option;
         inserting an additional field in the input form related to the selected option; and
         automatically populating the additional field with data related to the selected option.

11. The method of claim 10 further comprising:
providing the secondary display window to an output device to be viewable in relation to the primary display window.

12. The method of claim 10 further comprising:
receiving input commands relating to the key application;
determining a data set in the key application based on the input commands; and
associating the data set with at least one of the data fields in the input form.

13. The method of claim 12 further comprising:
providing a visual display of the insertion of the data set into the input form in the primary display.

14. The method of claim 12 further comprising:
prior to determining the data set in the key application, accessing a memory device to retrieve a plurality of data sets therefrom and providing the plurality of data sets to the key application.

15. The method of claim 14 wherein the step of determining the data set further includes receiving a selection command for selecting the data set.

16. The method of claim 10 further comprising:
when executing the key application, examining at least one of: previously entered data in the input form or data relating to the input form and executing the key application based on at least one of the previously entered data.

17. The method of claim 10 wherein the step of identifying the key application includes examining the data input and the data field having the data input therein.

18. The method of claim 10 wherein the key command is user defined.

19. A computer readable storage medium including executable instructions that when executed by a processing device cause the processing device to perform a method comprising:
receiving a textual input data typed by a user in a first data field of a first data type of an input form containing a plurality of data fields on a primary display frame, the input form corresponding to an input form type;
when the textual input data typed by the user is one of a plurality of predetermined help commands, executing a help application based on the help command, where the help application provides for the determination of a stored input data value to be inserted in the first data field; and
when the textual input data typed by the user is a key command:
identifying and accessing a key application, wherein the key application provides a list of user-selectable options in a generated secondary display, the list of user-selectable options being selected based on both the input form type and input data from a second data field of a second data type in the form; and
responsive to a received selected option from the list of user-selectable options:
populating the first data field with the selected option;
inserting an additional field in the input form related to the selected option; and
automatically populating, the additional field with data related to the selected option.

20. The computer readable storage medium of claim 19 including further executable instructions that when executed by the processing device provide for:
providing the secondary display window to an output device to be viewable in relation to the primary display window.

21. The computer readable storage medium of claim 19 including further executable instructions that when executed by the processing device provide for:
receiving input commands relating to the key application;
determining a data set in the key application based on the input commands;
associating the data set with at least one of the data fields in the input form; and
providing a visual display of the insertion of the data set into the input form in the primary display.

22. The computer readable storage medium of claim 21 including further executable instructions that when executed by the processing device provide for:
prior to determining the data set in the key application, accessing a memory device to retrieve a plurality of data sets therefrom and providing the plurality of data sets to the key application.

23. The computer readable storage medium of claim 22 wherein the step of determining the data set further includes receiving a selection command for selecting the data set.

24. The computer readable storage medium of claim 19 including further executable instructions that when executed by the processing device provide for:
when executing the key application, examining at least one of: previously entered data in the input form and data associated with the input form and executing the key application based on at least one of the previously entered data; and
wherein the step of identifying the key application includes examining the data input and the data field having the data input therein.

* * * * *